US008139947B2

(12) United States Patent
Ojima

(10) Patent No.: US 8,139,947 B2
(45) Date of Patent: Mar. 20, 2012

(54) OPTICAL TRANSMISSION APPARATUS WITH CLOCK SELECTOR

(75) Inventor: Hisayuki Ojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 618 days.

(21) Appl. No.: 12/379,116

(22) Filed: Feb. 12, 2009

(65) Prior Publication Data

US 2009/0297161 A1    Dec. 3, 2009

(30) Foreign Application Priority Data

May 27, 2008  (JP) ................................. 2008-137462

(51) Int. Cl.
*H04B 10/00*    (2006.01)

(52) U.S. Cl. ........ 398/135; 398/138; 398/139; 398/130; 398/154

(58) Field of Classification Search .................. 398/135, 398/138, 139, 130, 154
See application file for complete search history.

(56) References Cited

U.S. PATENT DOCUMENTS

| 7,020,401 B2* | 3/2006 | Sakano et al. ................. 398/175 |
| 7,360,954 B1* | 4/2008 | Seaver et al. .................... 385/92 |
| 2004/0052520 A1* | 3/2004 | Halgren et al. .................... 398/5 |
| 2007/0033466 A1* | 2/2007 | Buchmann et al. ........... 714/731 |
| 2009/0055676 A1* | 2/2009 | Wiebe .......................... 713/501 |

FOREIGN PATENT DOCUMENTS

| JP | 8-8888 | 1/1996 |
| JP | 2000-278261 | 10/2000 |

\* cited by examiner

*Primary Examiner* — Nathan Curs
*Assistant Examiner* — Tanya Ngo
(74) *Attorney, Agent, or Firm* — Staas & Halsey LLP

(57) ABSTRACT

An optical transmission apparatus includes a first transceiver unit coupled to a first node, a second transceiver unit coupled to a second node, an electrical signal processing unit provided between the transceiver units, a first transmission clock generating unit configured to generate a clock used by the second transceiver unit based on a clock of a signal arriving through the first node, a second transmission clock generating unit configured to generate a clock used by the first transceiver unit based on a clock of a signal arriving through the second node, a selector configured to select an output clock of the first transmission clock generating unit at a time of optical input interruption at the second node, and a frequency dividing unit configured to produce a frequency-divided clock obtained by dividing frequency of the output clock selected by the selector for provision to the second transmission clock generating unit.

5 Claims, 13 Drawing Sheets

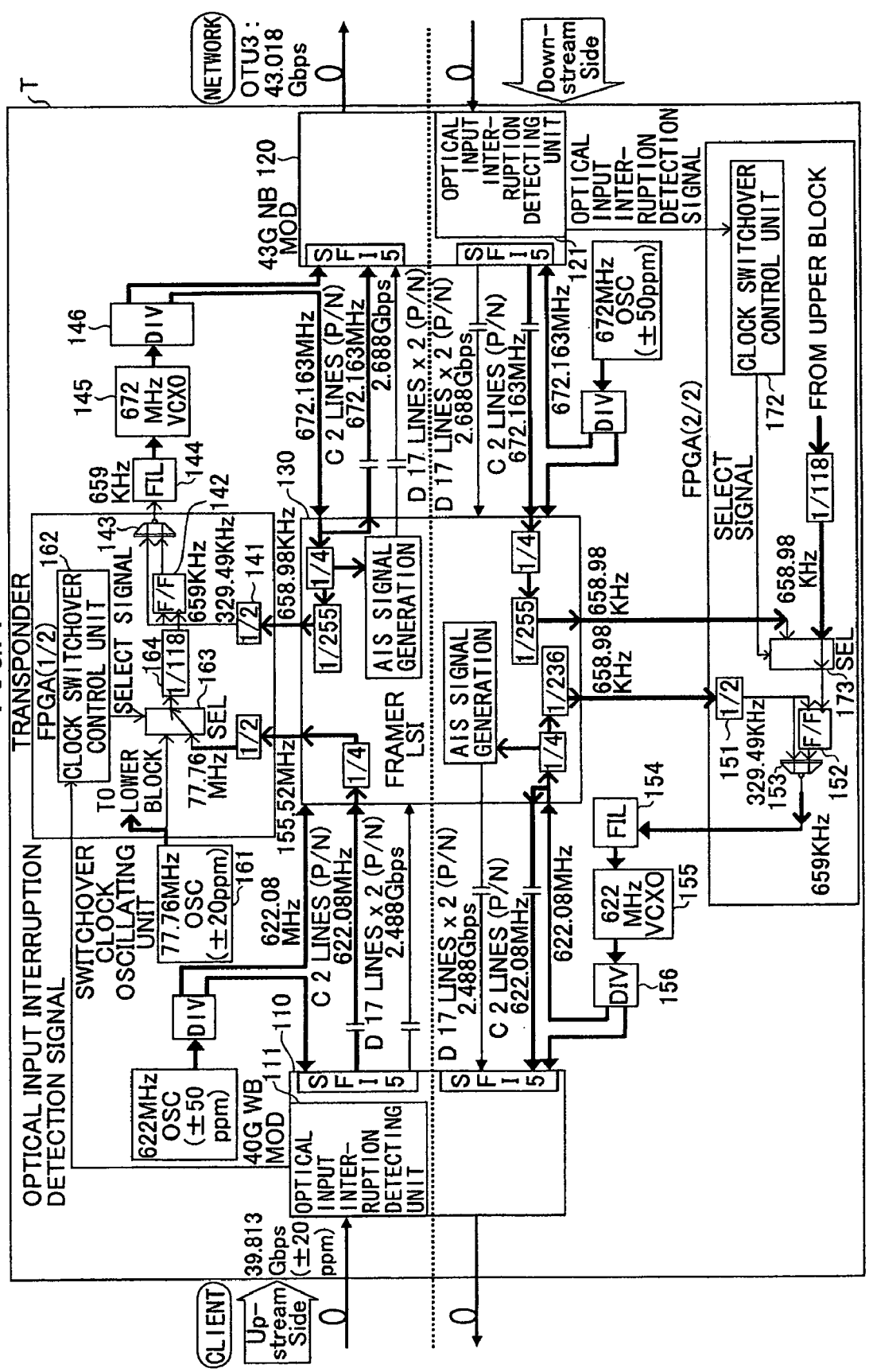

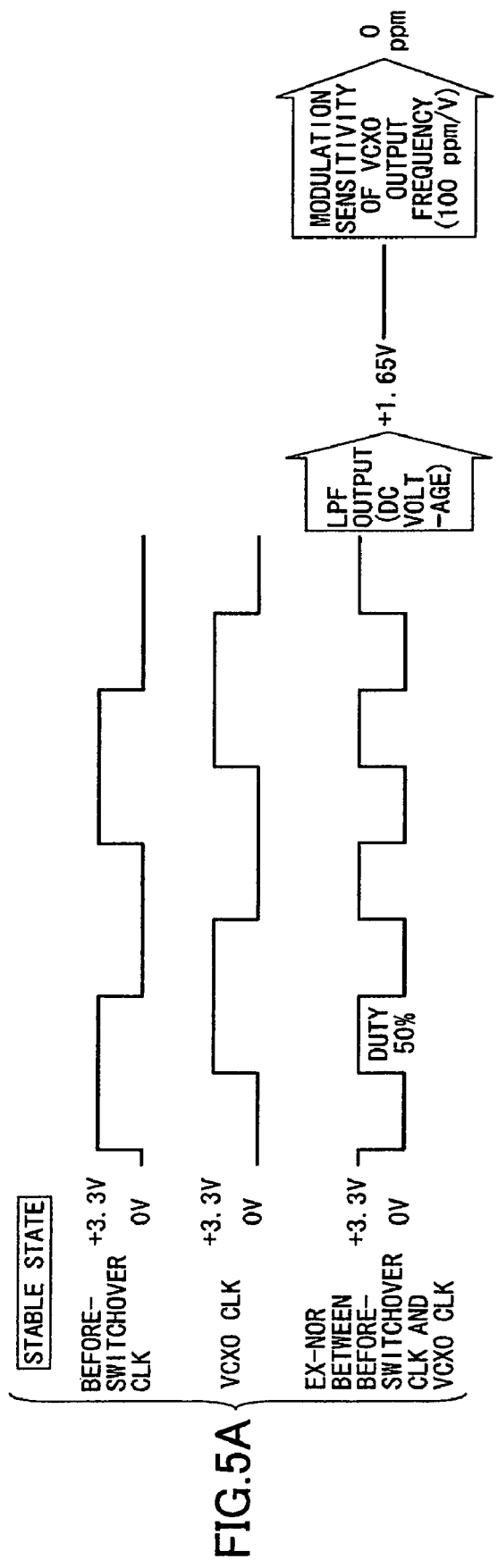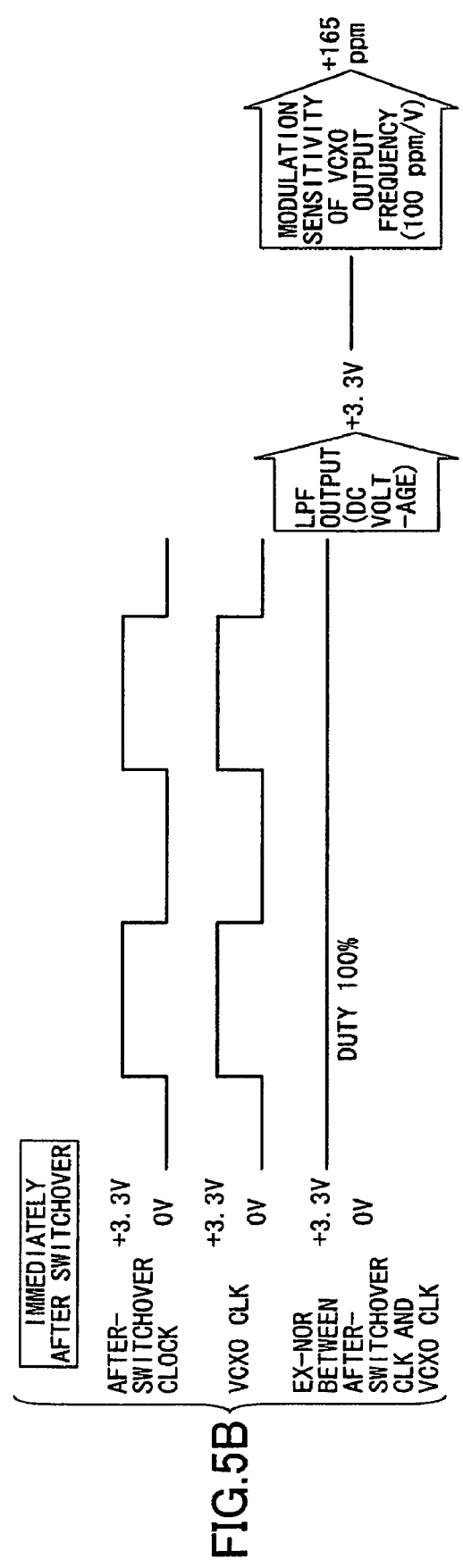

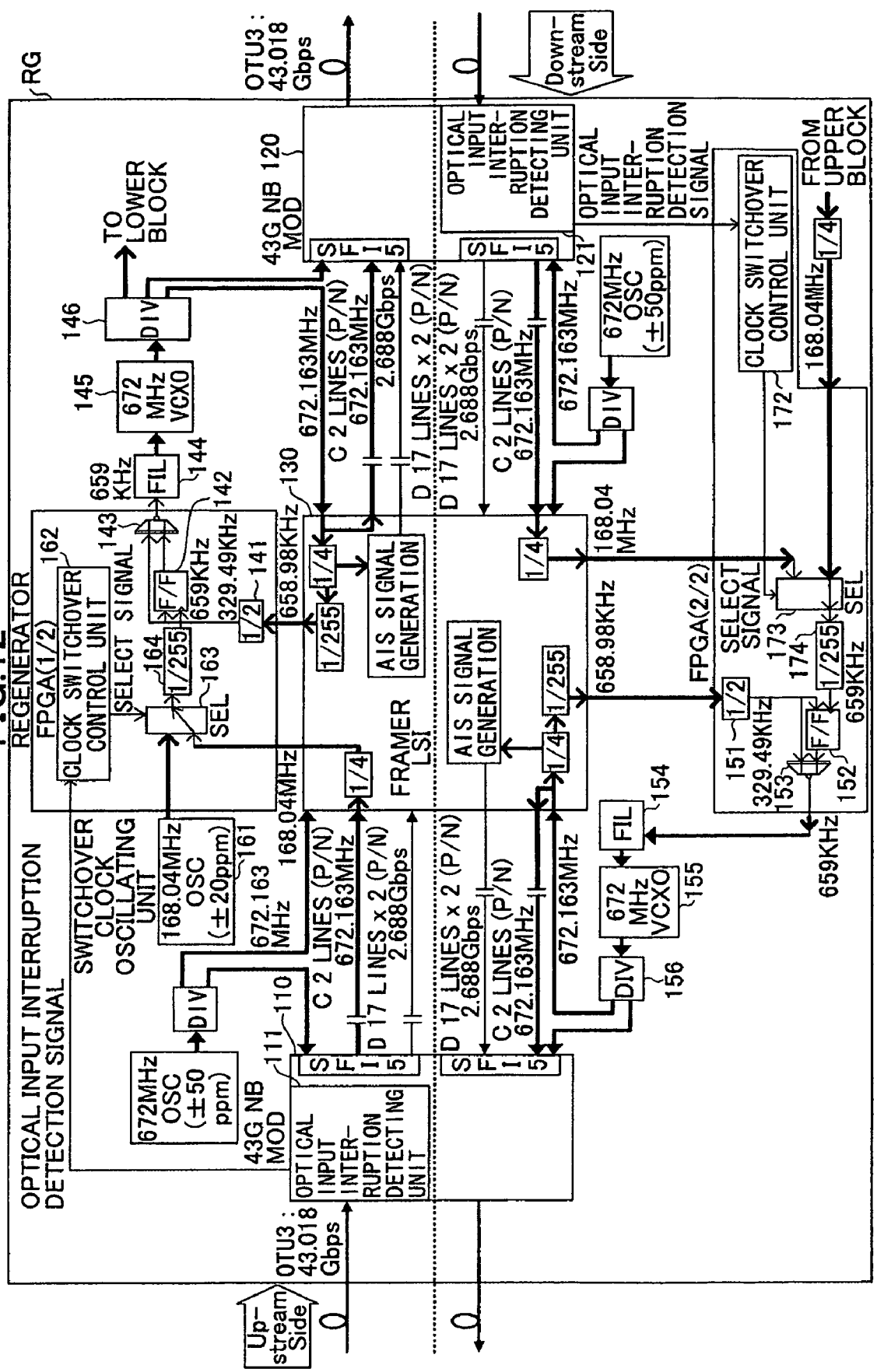

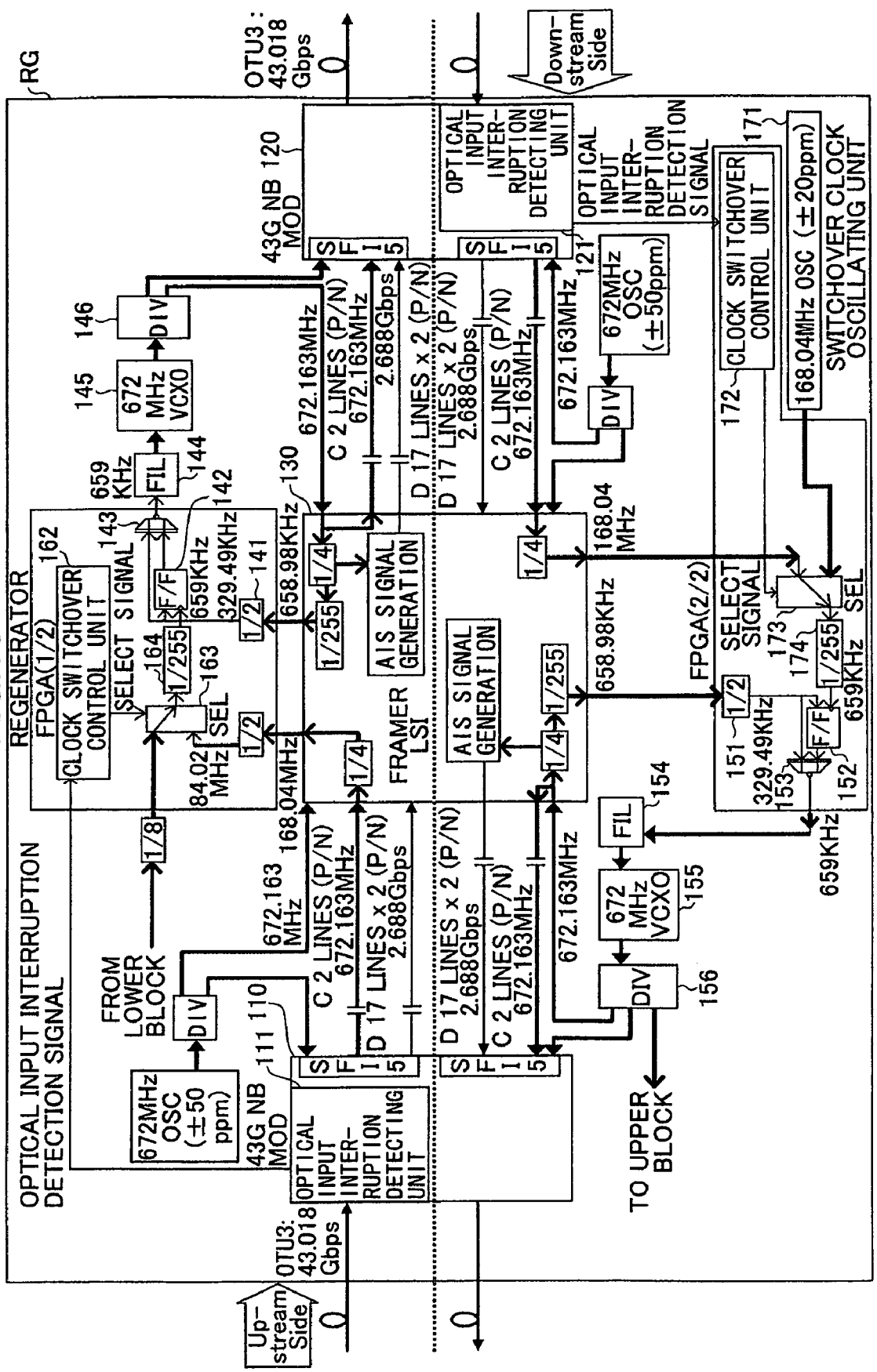

OPTICAL TRANSMISSION APPARATUS WITH CLOCK SELECTOR

CROSS-REFERENCE TO RELATED APPLICATIONS

The present application is based upon and claims the benefit of priority from the prior Japanese Patent Application No. 2008-137462 filed on May 27, 2008, with the Japanese Patent Office, the entire contents of which are incorporated herein by reference.

FIELD

The disclosures herein relate to optical transmission apparatuses such as transponders and regenerators each used as an element constituting part of an optical transmission system.

BACKGROUND

In optical communication systems, WDM (Wavelength Division Multiplexing) technology is employed to increase bandwidth. Client nodes such as routers use wideband optical signals. An optical wavelength conversion board referred to as a transponder is used to convert the optical signals from client nodes into narrowband optical signals having predetermined wavelengths with a narrow spectrum, and also to convert narrowband optical signals having predetermined wavelengths in the multiplexed domain into wideband optical signals.

FIG. 1 is a drawing showing an example of arrangement of transponders in an optical communication system.

On the left-hand side in FIG. 1, client nodes N11, N12, and so on are connected to respective transponders T11, T12, and so on, which are then connected to a optical wavelength division multiplexing/demultiplexing unit MD1. By the same token, on the right-hand side in FIG. 1, client nodes N21, N22, and so on are connected to respective transponders T21, T22, and so on, which are then connected to a optical wavelength division multiplexing/demultiplexing unit MD2. In a WDM transmission section between the optical wavelength division multiplexing/demultiplexing unit MD1 and the optical wavelength division multiplexing/demultiplexing unit MD2, long-distance transmission is performed by using optical amplifiers A11 and A12 provided along a path extending in one direction and optical amplifiers A21 and A22 provided along a path extending in the opposite direction.

FIG. 2 is a drawing showing an internal configuration of a transponder T (i.e., T11, T12, T21, T22, and so on). It should be noted that a signal direction extending from a client side to a network side (i.e., the side on which an optical wavelength division multiplexing/demultiplexing unit is provided) is hereinafter referred to as an upstream direction, and that a signal direction extending from a network side to a client side is hereinafter referred to as a downstream direction.

In FIG. 2, the transponder T includes an optical transceiver unit 110 for exchanging wideband optical signals with the client side and performing conversion between optical signals and electrical signals, an optical transceiver unit 120 for exchanging narrowband optical signals with the network side and performing conversion between optical signals and electrical signals, and an electrical signal processing unit 130 situated between the optical transceiver units 110 and 120 to perform frame processing, error correction processing, and so on. The error correction processing is performed in the electrical signal processing unit 130 for the purpose of preventing the degradation of error rate that may occur due to waveform deformation through long-distance transmission and the lowering of OSNR (optical signal noise ratio) in optical amplifiers. To this end, error correction codes are attached to signals transmitted to the network side, and FEC (Forward Error Correction) is performed based on the error correction codes received from the network side. Accordingly, the bit rate of signals on the network side is slightly greater than the bit rate of signals on the client side because of the addition of error correction codes.

The transponder T further includes a transmission PLL (Phase-Locked Loop) unit 140 for generating a clock for the network side based on a clock of the signals arriving from the client side, such that that the generated clock has a predetermined frequency ratio, and is synchronized with the base clock. The transponder T further includes a transmission PLL unit 150 for generating a clock for the client side based on a clock of the signals arriving from the network side, such that that the generated clock has frequency in a predetermined proportion to frequency of the base clock, and is synchronized with the base clock.

In the case of normal operation, the optical transceiver unit 120 outputs normal signals in the upstream direction based on the signals from the client side. Similarly, in the case of normal operation, the optical transceiver unit 110 outputs normal signals in the downstream direction based on the signals from the network side.

When a failure such as fiber disconnection occurs in an optical channel, the electrical signal processing unit 130 is required to transmit AIS (Alarm Indication Signal) indicative of the occurrence of failure in a predetermined format in the transmission direction if the product is directed to customers in North America. Namely, upon the occurrence of optical input interruption on the client side, the optical transceiver unit 120 needs to transmit the AIS signals in the upstream direction under the control of the electrical signal processing unit 130. Upon the occurrence of optical input interruption on the network side, on the other hand, the optical transceiver unit 110 needs to transmit the AIS signals in the downstream direction under the control of the electrical signal processing unit 130.

However, the transmission PLL unit 140 generates a network-side clock used by the optical transceiver unit 120 based on a clock of the signals arriving from the client side, and the transmission PLL unit 150 generates a client-side clock used by the optical transceiver unit 110 based on a clock of the signals arriving from the network side. When an optical input interruption occurs in either case, thus, the clock cannot be generated properly. In consideration of this, the clock source needs to be switched over upon detecting an optical input interruption.

FIG. 3 is a drawing showing an internal configuration of a transponder T provided with a clock switching function for use at the time of optical input interruption.

In FIG. 3, with respect to the upstream side (i.e., the side on which signals in the upstream direction are processed), the transponder T further includes, in addition to the configuration shown in FIG. 2, a switchover clock oscillating unit 161 for generating a switchover clock, a clock switchover control unit 162 for generating a clock switchover control signal upon receiving an optical input interruption detection signal from the optical transceiver unit 110, a selector 163 for selecting either the clock from the electrical signal processing unit 130 or the clock from the switchover clock oscillating unit 161 in response to the clock switchover control signal from the clock switchover control unit 162 (i.e., selecting the clock from the electrical signal processing unit 130 during normal operation and the clock from the switchover clock oscillating unit 161 at the time of optical input interruption), and a frequency dividing unit 164 for dividing the frequency of the output of the selector 163 to provide a clock to the transmission PLL unit 140.

With respect to the downstream side (i.e., the side on which signals in the downstream direction are processed), the transponder T further includes a clock switchover control unit 172 for generating a clock switchover control signal upon receiving an optical input interruption detection signal from the optical transceiver unit 120, and also includes a selector 173 for selecting either the clock from the electrical signal processing unit 130 or the clock from the switchover clock oscillating unit 161 in response to the clock switchover control signal from the clock switchover control unit 172 (i.e., selecting the clock from the electrical signal processing unit 130 during normal operation and selecting the clock from the switchover clock oscillating unit 161 at the time of optical input interruption) to provide a clock to the transmission PLL unit 150.

The frequency dividing unit 164 is provided to receive the output of the selector 163 with respect to the upstream side. This is because the switchover clock oscillating unit 161 is set to frequency that matches the bit rate on the client side. It thus suffices for the selector 163 to switch clocks having high frequency for subsequent frequency division. The reason why the switchover clock oscillating unit 161 is set to the frequency that matches the bit rate on the client side is that the client side uses frames such as those of SDH (Synchronous Digital Hierarchy). Because of the use of such frames, a widely available oscillator can be used as the switchover clock oscillating unit 161, which provides cost advantage.

FIG. 4 is a drawing showing the detail of an internal configuration of a clock system used in the transponder T. The same elements as those of FIG. 3 are referred to by the same numerals.

In FIG. 4, the clock switchover control unit 162 for the upstream side receives an optical input interruption detection signal from an optical input interruption detecting unit 111 of the optical transceiver unit 110. By the same token, the clock switchover control unit 172 for the downstream side receives an optical input interruption detection signal from an optical input interruption detecting unit 121 of the optical transceiver unit 120.

The transmission PLL unit 140 for the upstream side (see FIG. 3) includes a frequency dividing unit 141, a flip-flop 142, an EX-NOR gate 143, a low-pass filter 144, a voltage controlled oscillator 145, and a divider 146. The flip-flop 142 and the EX-NOR gate 143 together constitute a phase comparator. By the same token, the transmission PLL unit 150 for the downstream side (see FIG. 3) includes a frequency dividing unit 151, a flip-flop 152, an EX-NOR gate 153, a low-pass filter 154, a voltage controlled oscillator 155, and a divider 156. The flip-flop 152 and the EX-NOR gate 153 together constitute a phase comparator.

In FIG. 3 and FIG. 4, the selector 163 selects the clock from the electrical signal processing unit 130 with respect to the upstream side during the normal operation. The clock arriving from the client side is thus supplied to the transmission PLL unit 140 via the frequency dividing unit 164, so that the network-side clock is generated base on this supplied clock to transmit normal signals from the optical transceiver unit 120 to the network side. By the same token, the selector 173 selects the clock from the electrical signal processing unit 130 with respect to the downstream side during the normal operation. The clock arriving from the network side is thus supplied to the transmission PLL unit 150, so that the client-side clock is generated base on this supplied clock to transmit normal signals from the optical transceiver unit 110 to the client side.

At the time of optical input interruption on the client side, the selector 163 selects the clock from the switchover clock oscillating unit 161 with respect to the upstream side. The clock of the switchover clock oscillating unit 161 is thus supplied to the transmission PLL unit 140 via the frequency dividing unit 164, so that the network-side clock is generated base on this supplied clock to transmit the AIS signals generated by the electrical signal processing unit 130 to the network-side via the optical transceiver unit 120. By the same token, at the time of optical input interruption on the network side, the selector 173 selects the clock from the switchover clock oscillating unit 161 with respect to the downstream side. The clock of the switchover clock oscillating unit 161 is thus supplied to the transmission PLL unit 150, so that the client-side clock is generated base on this supplied clock to transmit the AIS signals generated by the electrical signal processing unit 130 to the client-side via the optical transceiver unit 110.

Related-art transponders have the configurations and operations as described above. The problem is that frequency jump may occur in the PLL immediately after the switching of clocks during the downstream-side processing performed upon optical input interruption on the network side. This results in the failure to obtain a stable clock, thereby failing to transmit the AIS signals.

In the following, a mechanism by which frequency jump occurs will be described.

In FIG. 3 and FIG. 4, the clock switchover control unit 172 receives an optical input interruption detection signal upon the detection of optical input interruption by the optical input interruption detecting unit 121, and supplies a clock switchover control signal to the selector 173. The selector 173 selects the clock from the switchover clock oscillating unit 161 to provide the clock from the switchover clock oscillating unit 161 (after proper frequency division) to the transmission PLL unit 150.

In so doing, the flip-flop 152 and the EX-NOR gate 153 constituting the phase comparator of the transmission PLL unit 150 compares phases between the clock supplied from the voltage controlled oscillator 155 via the electrical signal processing unit 130 (i.e., a clock having its frequency properly divided after the voltage controlled oscillator 155) and the clock supplied from the switchover clock oscillating unit 161 selected by the selector 173 (i.e., a clock having its frequency properly divided after the switchover clock oscillating unit 161). Since these two clocks are asynchronous with each other even if their frequencies are the same, a phase jump of 180 degrees may occur at the maximum. The results of the phase comparison appear as a change in the output duty (i.e., the width of a high pulse in the output square wave). The above-noted phase jump causes an abrupt change in this output duty. As a result, a direct-current voltage obtained by smoothing the square wave by the low-pass filter 154 ends up having a large displacement from the stable-state level. The frequency of the voltage controlled oscillator 155 controlled by such a voltage thus exhibits a sudden change, which constitutes a frequency jump.

FIGS. 5A and 5B are drawings showing examples of operations of the transmission PLL unit 150 observed at the time of clock switching with respect to the downstream direction. FIG. 5A shows waveforms in the stable state, and FIG. 5B shows waveforms immediately after clock switching. In FIG. 5A, the clock of the voltage controlled oscillator 155 becomes the H level at the midpoint of the H-level period of the before-switchover clock (i.e., the clock supplied from the electrical signal processing unit 130), so that the output duty is set to 50% as a result of phase comparison. It follows that a direct-current voltage obtained through smoothing by the low-pass filter 154 is set to a level (1.65 V) that is about a half of the power supply voltage (3.3 V). In FIG. 5B, on the other hand, the after switchover clock (i.e., the clock supplied from the switchover clock oscillating unit 161) has a phase displacement of 180 degrees (in the worst case scenario), so that the output duty is set to 100% as a result of phase comparison. It follows that a direct-current voltage obtained through smoothing by the low-pass filter 154 is set to the same level as the power supply voltage (3.3 V).

A deviation of the center frequency of the clock required to transmit the AIS signals must be set within 20 ppm according to the standard. It naturally follows that the switchover clock oscillating unit 161 needs to have precision satisfying the 20-ppm requirement. In addition, the frequency precision becomes +165 ppm when the modulation sensitivity of the voltage controlled oscillator 155 is 100 ppm/V in the worst case scenario shown in FIG. 5B. It is thus almost impossible to satisfy the requirement. As time passes, the frequency jump disappears, and the deviation gradually becomes stable, so that the 20-ppm requirement will be met. Immediately after the switching, however, the clock cannot be used.

It may be possible to increase the delay of the time constant of the PLL response for the purpose of reducing a sudden change. However, such a sudden change cannot be completely avoided.

With respect to the upstream side that is opposite to the signal direction that has been described above, the frequency of the switchover clock oscillating unit 161 is set to match the bit rate on the client side as described above, so that the frequency dividing unit 164 is used to divide frequency after the switching of clocks by the selector 163. Because of this, a phase shift occurring immediately after clock switching has a reduced effect in commensurate with the ratio of the frequency division. Accordingly, frequency jump is not in existent immediately after clock switchover. FIG. 6 is a drawing showing an example of operation of the transmission PLL unit 140 observed at the time of clock switching with respect to the upstream direction. The frequency division ratio is assumed to be ⅒ for the sake of simplicity. There is an illustrated phase displacement (which is equal to 180 degrees corresponding to the worst case scenario) between a clock CLK#1 before frequency division (i.e., the clock supplied from the electrical signal processing unit 130) and a clock CLK#2 before frequency division (i.e., the clock supplied from the switchover clock oscillating unit 161). Such a phase displacement becomes minute when compared to one clock cycle after frequency division, thereby exerting only a negligible effect.

From the 10-Gbps optical transmission, a further speed increase is required to cope with recent traffic increases in communication apparatuses. A standard has already been set forth for 40-Gbps transmission speed apparatuses for use as the next-generation communication apparatuses, and efforts have been being made on the development of such apparatuses. The bit-rate increase due to the FEC process is defined to be different ratios between the 10-Gbps speed configuration and the 40-Gbps speed configuration according to the standard (ITU-T G.709). The bit rate on the client side and the bit rate on the network side are as follows.

|  | Client Side | Network Side | Client:Network |
|---|---|---|---|
| 10 Gbps Bit Rate | 9.953280 Gbps | 10.709225 Gbps | 237:255 |
| 40 Gbps Bit Rate | 39.81320 Gbps | 43.018500 Gbps | 236:255 |

In the case of 10 Gbps, the ratio of bit rates between the client side and the network side is 237:255. The greatest common divisor in this case is "3". Frequency can thus be divided by "3" after clock switchover on the downstream side so as to slightly reduce an effect of phase shift based on the same principle as in the case of the upstream side described above. However, frequency division by 3 would not bring about sufficient improvement.

In the case of 40 Gbps that is expected to be widely used in the future, the ratio of bit rates between the client side and the network side is 236:255. There is no greatest common divisor in this case. The same principle as in the case of the upstream side previously described thus cannot be utilized. Namely, the output of the reference oscillator needs to be frequency-divided to perform frequency alignment before clock switchover, so that it is not possible to reduce an effect of phase shift by switching high-speed clocks first and then performing frequency division.

It should be noted that the provision of a new reference oscillator matching the frequency of the network side can remove an effect of phase shift on the downstream side. As previously described, however, the frequency on the network side corresponds to a special bit rate that is different from a generally used bit rate such as that of SDH. Further, the 20-ppm precision is needed to comply with the standard regarding frequency stability required for AIS transmission. New product development is thus necessary, which results in a cost increase due to the use of an expensive component. Such configuration is thus not a practically viable choice.

Patent Document 1 discloses technology for use in a clock switching control circuit of an ISDM connection apparatus. This technology prevents disturbance in the output clock at the time of switching input clocks into the PLL for generating multiple clocks. Patent Document 2 discloses technology that prevents an instantaneous interruption in an output clock signal and also reduces a phase shift at the time of switching operation.

These technologies do not take into account the special circumstances regarding transponders or the like as previously described, and cannot overcome the above-identified problems.

It may thus be desirable to provide an optical transmission apparatus that can stabilize a clock at the time of clock switchover performed upon optical input interruption.

[Patent Document 1] Japanese Patent Application Publication No. 2000-278261

[Patent Document 2] Japanese Patent Application Publication No. 8-8888

SUMMARY

According to one embodiment, an optical transmission apparatus includes a first optical transceiver unit configured to exchange optical signals with an apparatus connected to a first input and output node and to perform signal conversion between optical signals and electrical signals; a second optical transceiver unit configured to exchange optical signals with an apparatus connected to a second input and output node and to perform signal conversion between optical signals and electrical signals; an electrical signal processing unit configured to connect between the first transceiver unit and the second transceiver unit and to perform electrical signal processing; a first transmission clock generating unit configured to generate, based on a first clock of a signal arriving through the first input and output node, a transmission-purpose clock used by the second transceiver unit that has frequency in a predetermined proportion to frequency of the first clock and is synchronized with the first clock; a second transmission clock generating unit configured to generate, based on a second clock of a signal arriving through the second input and output node, a transmission-purpose clock used by the first transceiver unit that has frequency in a predetermined proportion to frequency of the second clock and is synchronized with the second clock; a selector configured to select an output clock of the first transmission clock generating unit at a time of optical input interruption at the second input and output node; and a frequency dividing unit configured to produce a frequency-divided clock obtained by dividing frequency of the output clock selected by the selector and to supply the frequency-divided clock to the second transmission clock generating unit.

Additional objects and advantages of the embodiments will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

Other objects and further features of the present invention will be apparent from the following detailed description when read in conjunction with the accompanying drawings, in which:

FIG. 4 is a drawing showing the detail of an internal configuration of a clock system provided in the transponder;

FIGS. 5A and 5B are drawings showing examples of operations of a transmission PLL unit observed at the time of clock switching with respect to the downstream direction;

FIG. 12 is a drawing showing the detail of an internal configuration of a clock system provided in a regenerator according to the third embodiment; and FIG. 13 is a drawing showing the detail of an internal configuration of a clock system provided in a regenerator according to the fourth embodiment.

DESCRIPTION OF EMBODIMENTS

In the following, embodiments of the present invention will be described with reference to the accompanying drawings.

First Embodiment

Figure 7:
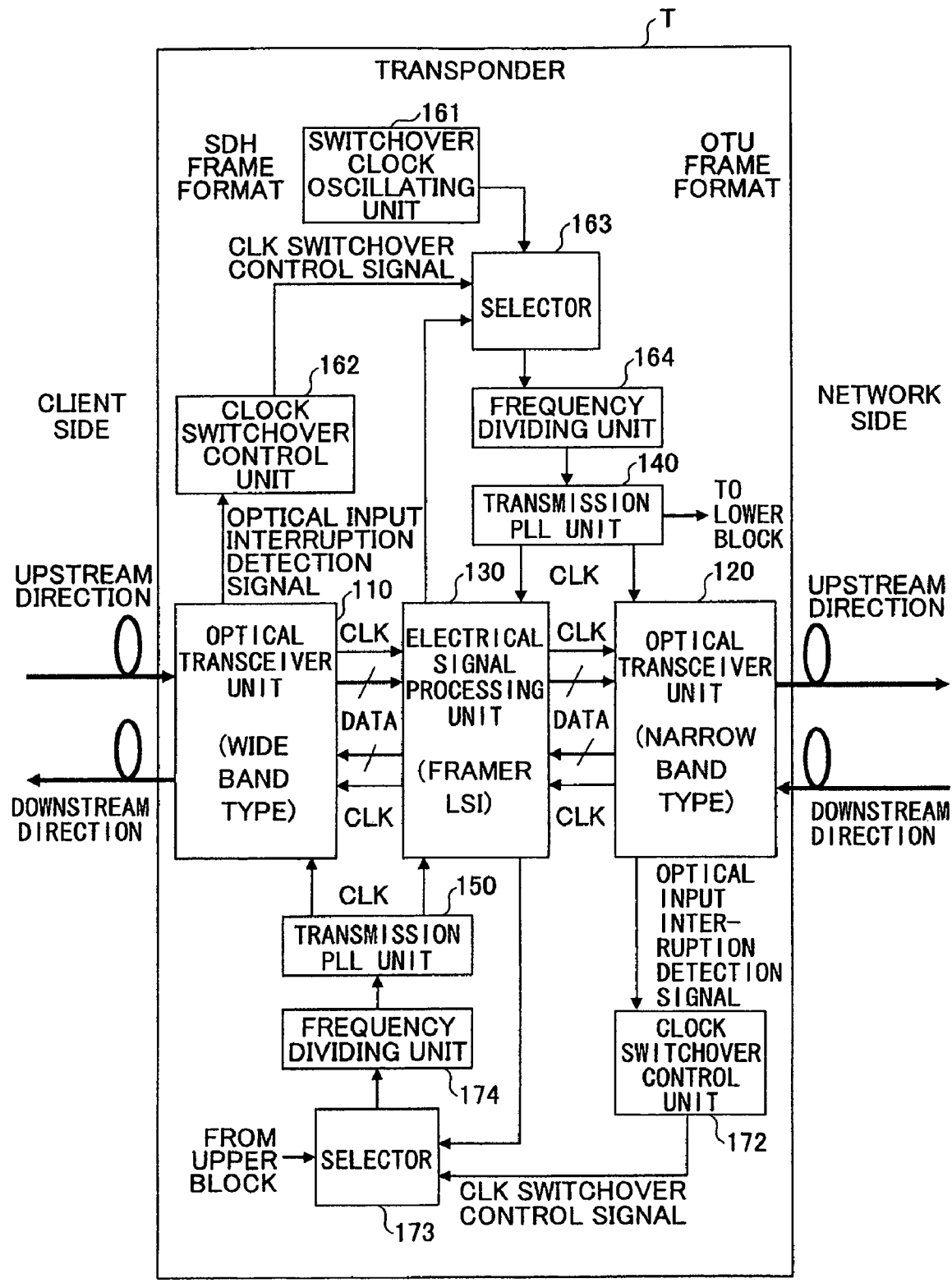
FIG. 7 is a drawing showing an example of an internal configuration of a transponder according to a first embodiment.

FIG. 7 is a drawing showing an example of an internal configuration of a transponder according to a first embodiment. The arrangement of the transponder in an optical communication system is the same as the arrangement shown in FIG. 1.

In FIG. 7, the transponder T includes an optical transceiver unit 110 for exchanging wideband optical signals with the client side and performing conversion between optical signals and electrical signals, an optical transceiver unit 120 for exchanging narrowband optical signals with the network side and performing conversion between optical signals and electrical signals, and an electrical signal processing unit 130 situated between the optical transceiver units 110 and 120 to perform electrical signal processing such as frame processing and error correction processing. The transponder T further includes a transmission PLL unit (transmission clock generating unit) 140 for generating a clock for the network side based on a clock of the signals arriving from the client side, such that that the generated clock has a predetermined frequency ratio, and is synchronized with the base clock. The transponder T further includes a transmission PLL unit (transmission clock generating unit) 150 for generating a clock for the client side based on a clock of the signals arriving from the network side, such that that the generated clock has frequency in a predetermined proportion to frequency of the base clock, and is synchronized with the base clock.

With respect to the upstream side, the transponder T further includes a switchover clock oscillating unit 161 for generating a switchover clock, a clock switchover control unit 162 for generating a clock switchover control signal upon receiving an optical input interruption detection signal from the optical transceiver unit 110, a selector 163 for selecting either the clock from the electrical signal processing unit 130 or the clock from the switchover clock oscillating unit 161 in response to the clock switchover control signal from the clock switchover control unit 162 (i.e., selecting the clock from the electrical signal processing unit 130 during normal operation and the clock from the switchover clock oscillating unit 161 at the time of optical input interruption), and a frequency dividing unit 164 for dividing the frequency of the output of the selector 163 to provide a clock to the transmission PLL unit 140.

With respect to the downstream side, the transponder T further includes a clock switchover control unit 172 for generating a clock switchover control signal upon receiving an optical input interruption detection signal from the optical transceiver unit 120, a selector 173 for selecting either the clock from the electrical signal processing unit 130 or the clock from the transmission PLL unit 140 of the upstream side in response to the clock switchover control signal from the clock switchover control unit 172 (i.e., selecting the clock from the electrical signal processing unit 130 during normal operation and selecting the clock from the transmission PLL unit 140 at the time of optical input interruption), and a frequency dividing unit 174 for dividing the frequency of the output of the selector 173 to provide a clock to the transmission PLL unit 150. Namely, the clock of the transmission PLL unit 140 for the upstream side is used as a switchover clock in order to stabilize the downstream-direction clock at the time of clock switchover. Since this clock has frequency that matches the frequency on the network side, frequency ratios for clock switchover are aligned. Because of this, the selector 173 can perform clock switchover with respect to high-frequency clock signals, and the frequency dividing unit 174 can subsequently perform frequency division. Further, this clock is synchronized with the main signals, and its deviation is guaranteed to be within the 20-ppm range (the main signals are within the 20-ppm range). Also, this deviation reliably stays within the 20-ppm range even if the main optical signals are interrupted, so that this clock can be used as a stable reference clock.

Figure 8:
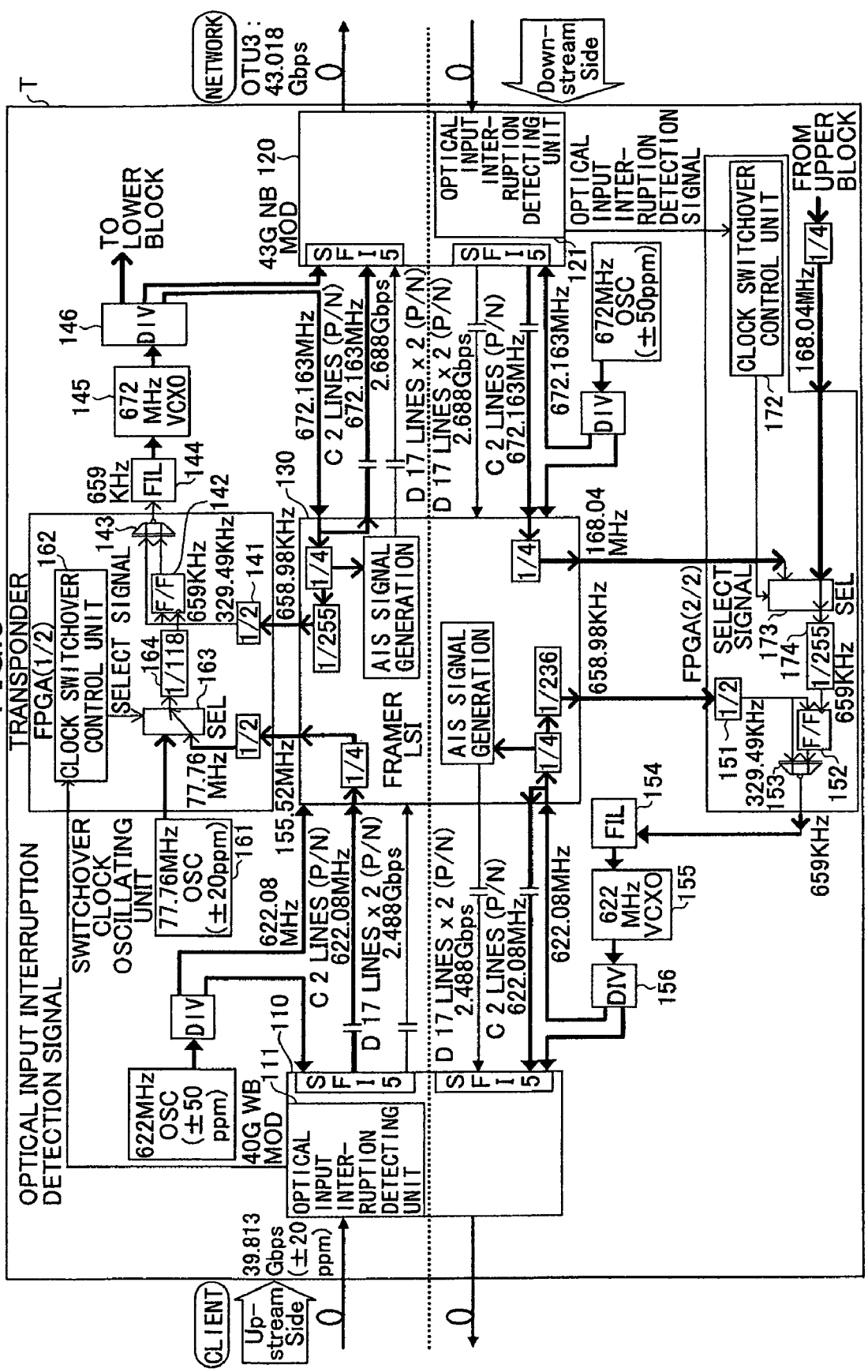
FIG. 8 is a drawing showing the detail of an internal configuration of a clock system provided in the transponder according to the first embodiment.

FIG. 8 is a drawing showing the detail of an internal configuration of a clock system used in the transponder T according to the first embodiment. The same elements as those of FIG. 7 are referred to by the same numerals.

In FIG. 8, the clock switchover control unit 162 for the upstream side receives an optical input interruption detection signal from an optical input interruption detecting unit 111 of the optical transceiver unit 110. By the same token, the clock switchover control unit 172 for the downstream side receives an optical input interruption detection signal from an optical input interruption detecting unit 121 of the optical transceiver unit 120.

The transmission PLL unit 140 for the upstream side (see FIG. 7) includes a frequency dividing unit 141, a flip-flop 142, an EX-NOR gate 143, a low-pass filter 144, a voltage controlled oscillator 145, and a divider 146. The flip-flop 142 and the EX-NOR gate 143 together constitute a phase comparator. By the same token, the transmission PLL unit 150 for the downstream side (see FIG. 7) includes a frequency dividing unit 151, a flip-flop 152, an EX-NOR gate 153, a low-pass filter 154, a voltage controlled oscillator 155, and a divider 156. The flip-flop 152 and the EX-NOR gate 153 together constitute a phase comparator.

In FIG. 7 and FIG. 8, the optical input interruption detecting unit 121 of the optical transceiver unit 120 detects an optical input interruption when such an optical input interruption occurs in the downstream direction on the network side. An optical input interruption detection signal is then supplied to the clock switchover control unit 172. In response, the clock switchover control unit 172 causes the selector 173 to switch from the clock from the electrical signal processing unit 130 to the clock from the transmission PLL unit 140 (i.e., a clock obtained by dividing by four the frequency of the output of the voltage controlled oscillator 145 of the upstream side). The clock supplied from the electrical signal processing unit 130 and the clock supplied from the transmission PLL unit 140 have almost identical frequencies, but have different phase. A sudden phase shift thus occurs immediately after the clock switchover. At the stage subsequent to the selector 173, the frequency dividing unit 174 divides by 255 the frequency of the clock having such a phase displacement, so that the amount of phase displacement is reduced by a factor of 1/255. Accordingly, the pulse outputs obtained by phase comparison performed by the flip-flop 152 and the EX-NOR gate 153 should appear to have little phase shift. Because of little phase shift, a direct-current voltage obtained through smoothing by the low-pass filter 154 does not exhibit a change, so that the frequency of the voltage controlled oscillator 145 remains stable. A clock generated in this manner is used for the operations of the electrical signal processing unit 130 and the optical transceiver unit 110 to transmit the AIS signals in a stable manner.

In the related-art technology shown in FIG. 5B, the output voltage of the low-pass filter 154 changes from a stable level of 1.65 V to 3.3 V immediately after clock switchover. In this case, frequency precision is +165 ppm when the modulation sensitivity of the voltage controlled oscillator 155 is 100 ppm/V. In the present embodiment, on the other hand, the deviation is reduce by 1/255. Because of this, the maximum value is 0.647 ppm even in the extreme case where the PLL time constant is the fastest. This does not affect the 20-ppm requirement defined by the SDH standard.

In the present embodiment as described above, the clock of the upstream direction is used as a switchover-purpose reference clock for the downstream direction at the time of optical input interruption, thereby satisfying the requirement for frequency stability precision at the time of clock switchover. Since the clock used in this configuration is a clock that is originally in existence, there is no need to add a new frequency oscillator. This arrangement can improve performance without incurring a cost increase.

Second Embodiment

Figure 9:
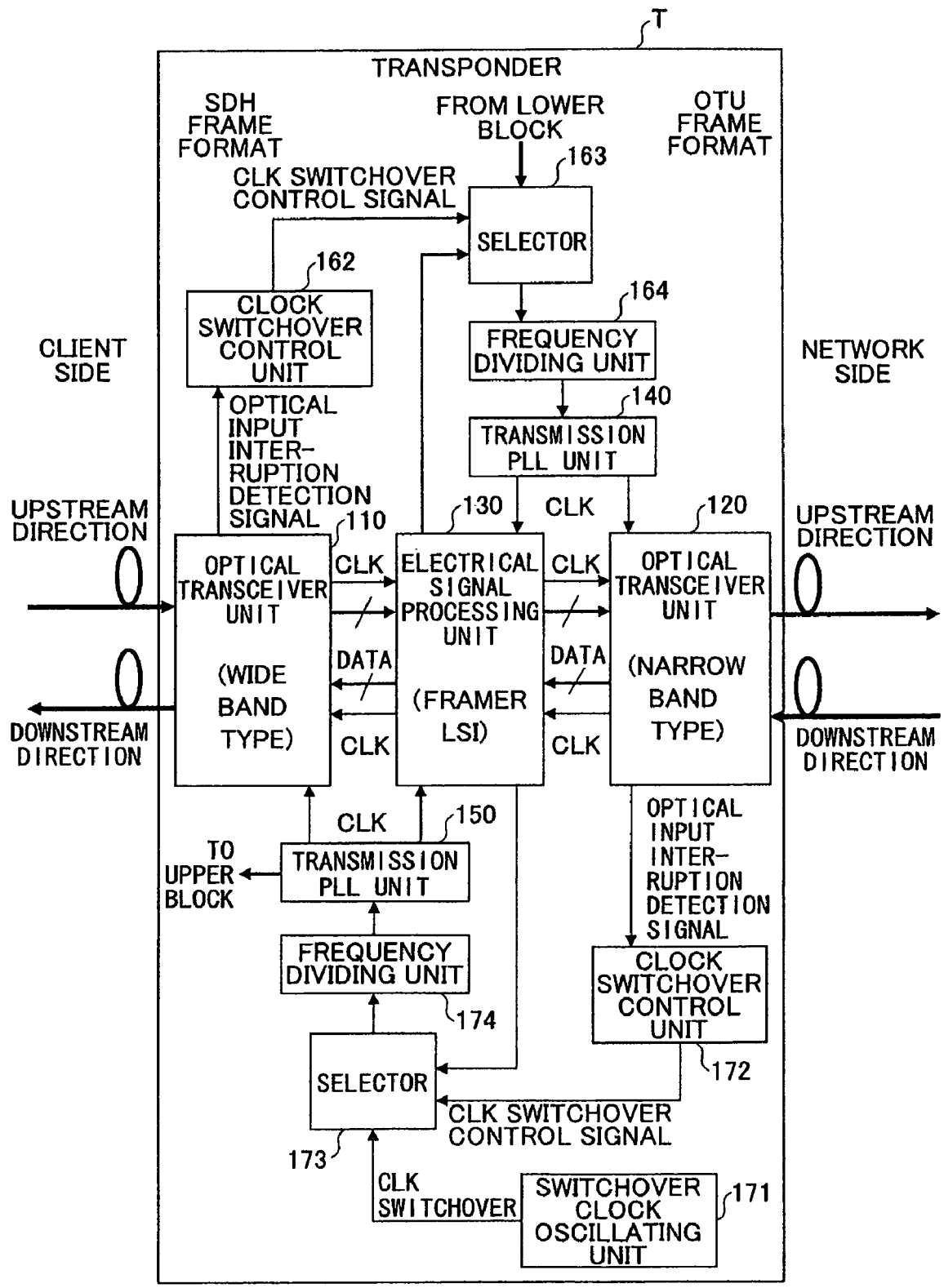
FIG. 9 is a drawing showing an example of an internal configuration of a transponder according to a second embodiment.

FIG. 9 is a drawing showing an example of an internal configuration of a transponder according to a second embodiment. This example is directed to a case in which the basic principle of using a clock for the opposite direction is applied to the upstream side. In the first embodiment described above, the switchover clock oscillating unit is configured to oscillate at frequency that matches the bit rate on the client side. The second embodiment, on the other hand, is applicable to a case in which a switchover clock oscillating unit is configured to oscillate at frequency that matches the bit rate on the network side.

In FIG. 9, a switchover clock oscillating unit 171 is provided for the downstream side of the transponder T, and the switchover clock oscillating unit 161 (see FIG. 7) is removed from the upstream side. The selector 173 on the downstream side receives a switchover clock from the switchover clock oscillating unit 171. The selector 163 on the upstream side receives a clock from the transmission PLL unit 150 of the downstream side.

Figure 10:
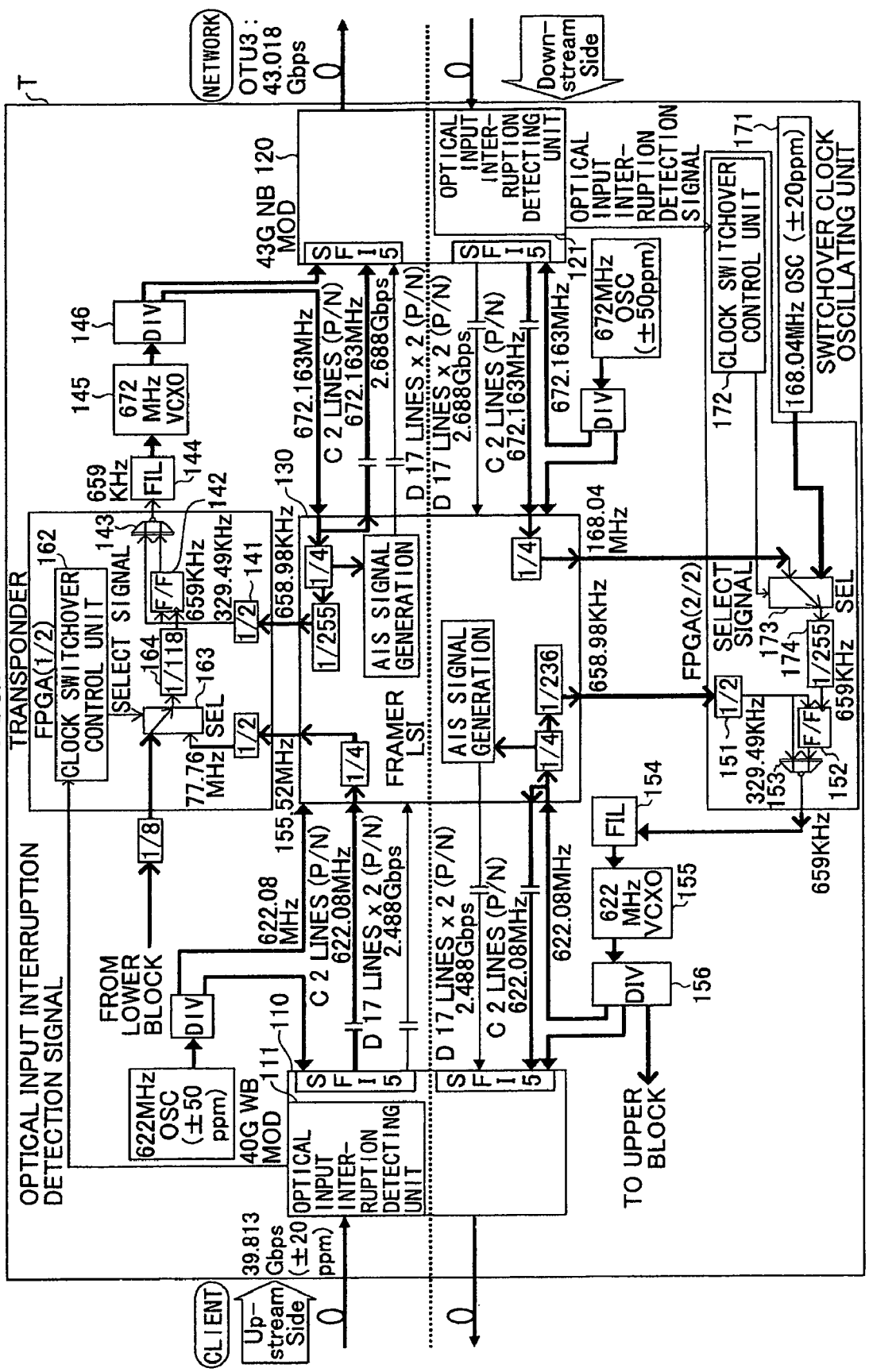
FIG. 10 is a drawing showing the detail of an internal configuration of a clock system provided in the transponder according to the second embodiment.

FIG. 10 is a drawing showing the detail of an internal configuration of a clock system used in the transponder T according to the second embodiment. The same elements as those of FIG. 9 are referred to by the same numerals.

Third Embodiment

In the first and second embodiments described above, a transponder is employed as an optical transmission apparatus. In third and fourth embodiments, on the other hand, a regenerator (i.e., a transponder of a relay type) for reconstructing transmission signals is employed as an optical transmission apparatus. A regenerator is supposed to be arranged as an intermediary element in a network. Unlike a transponder, the bit rates do not differ from each other between the client side and the network side as a general principle. By employing the same basic configuration for both a transponder and a regenerator, however, it is possible to simplify their design, manufacturing, and maintenance.

Figure 11:
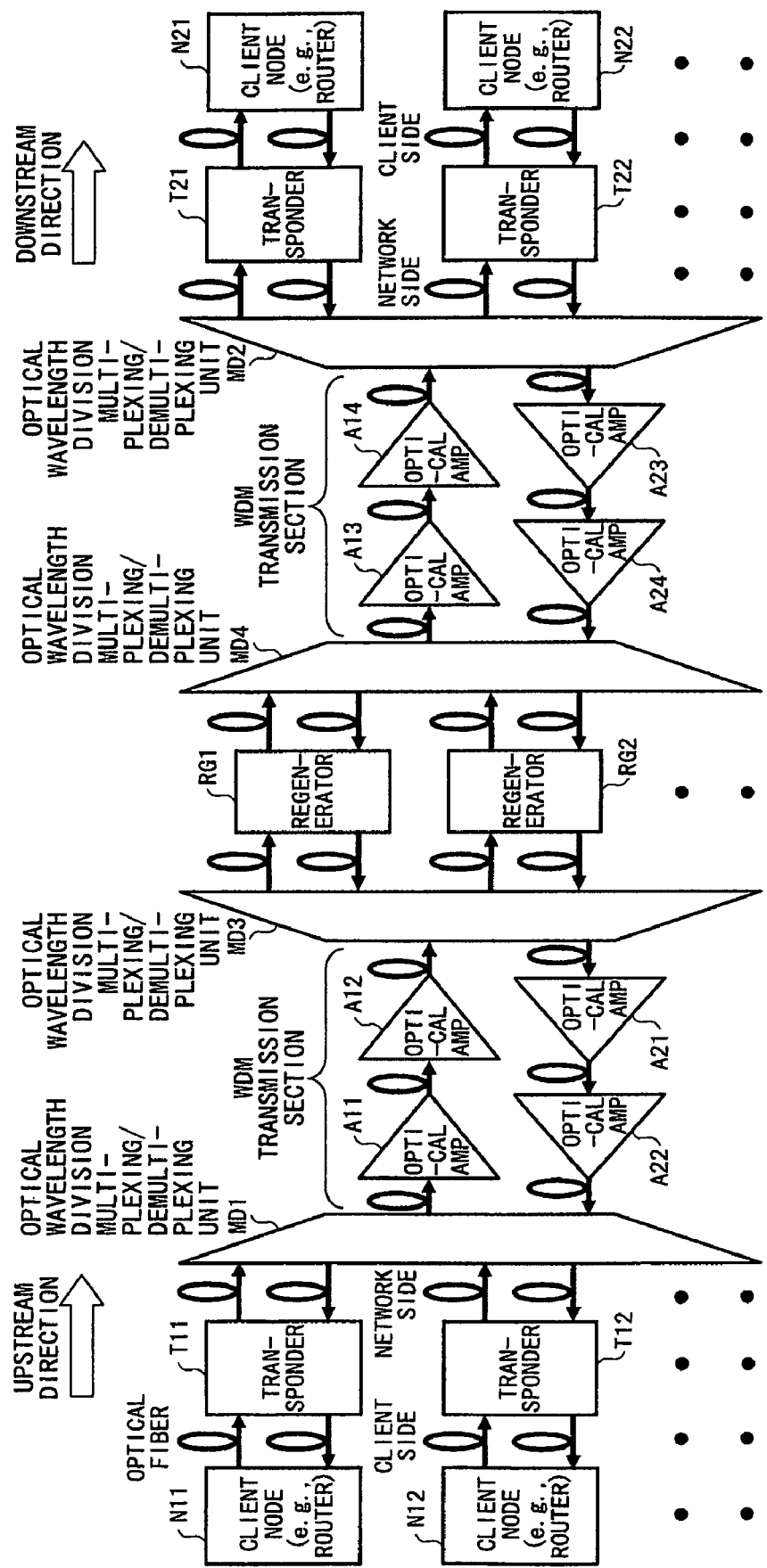
FIG. 11 is a drawing showing an example of arrangement of regenerators in an optical communication system.

FIG. 11 is a drawing showing an example of arrangement of regenerators in an optical communication system.

Figure 1:
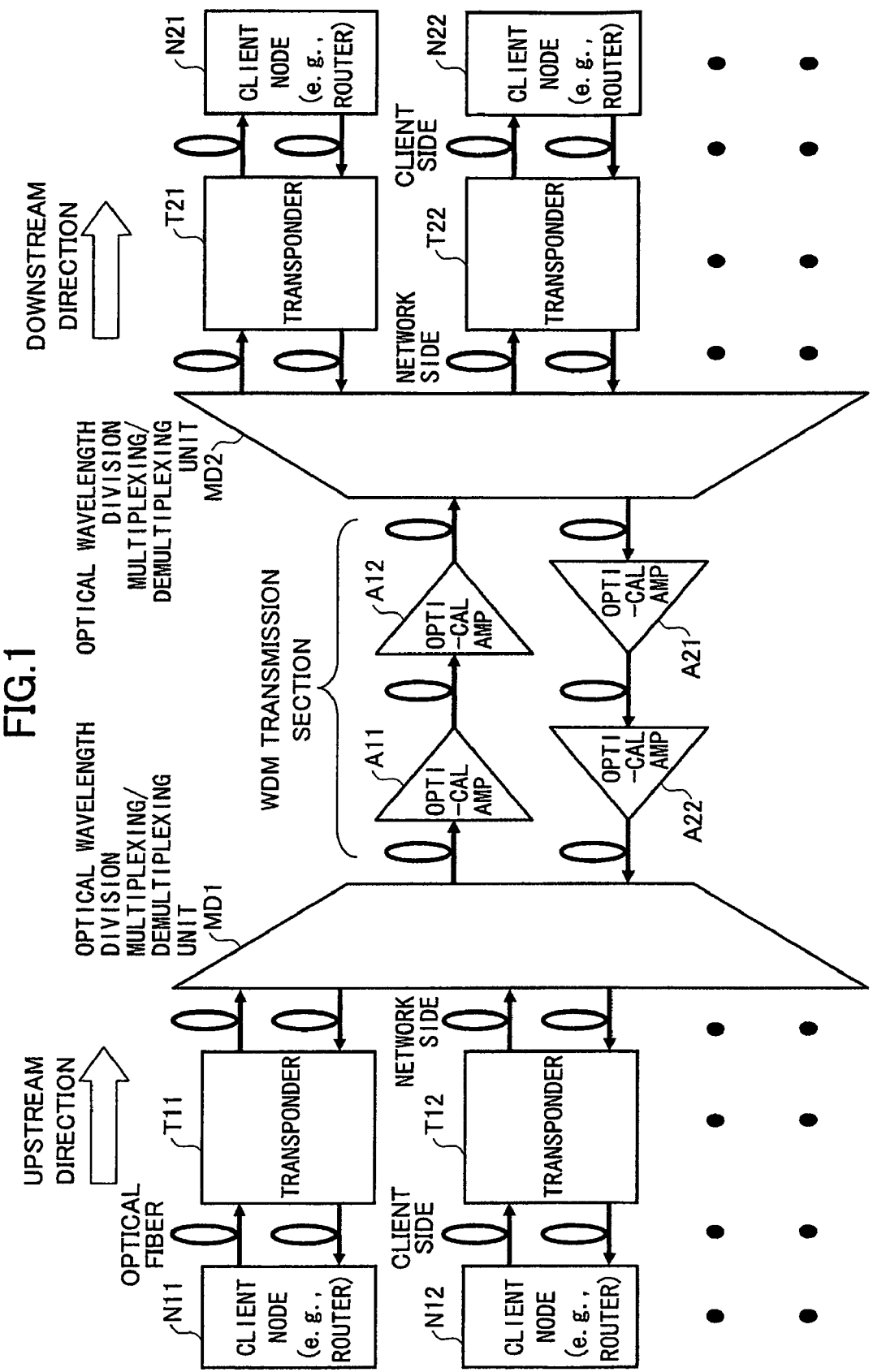
FIG. 1 is a drawing showing an example of arrangement of transponders in an optical communication system.
Figure 2:
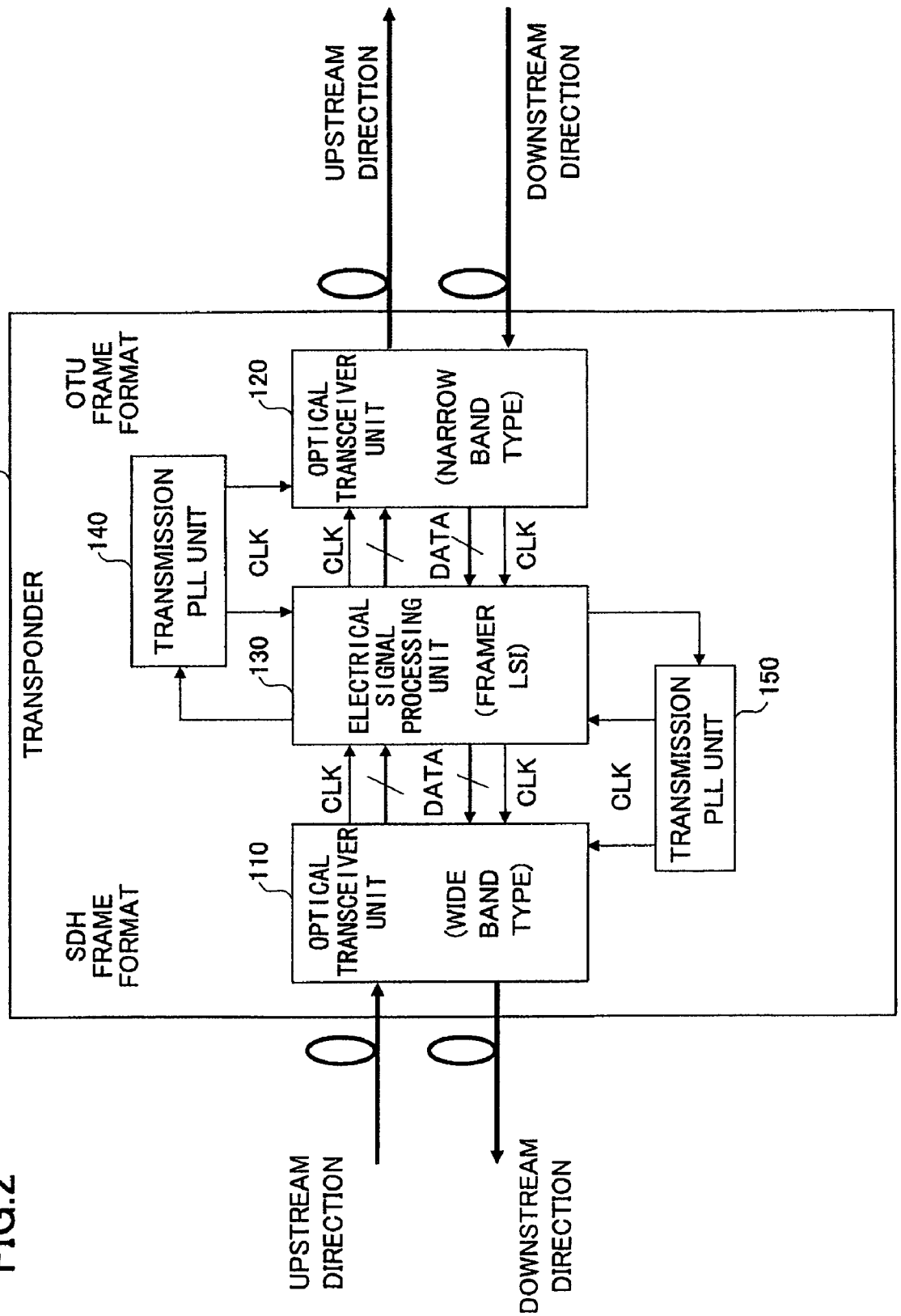
FIG. 2 is a drawing showing an internal configuration of a transponder.
Figure 3:
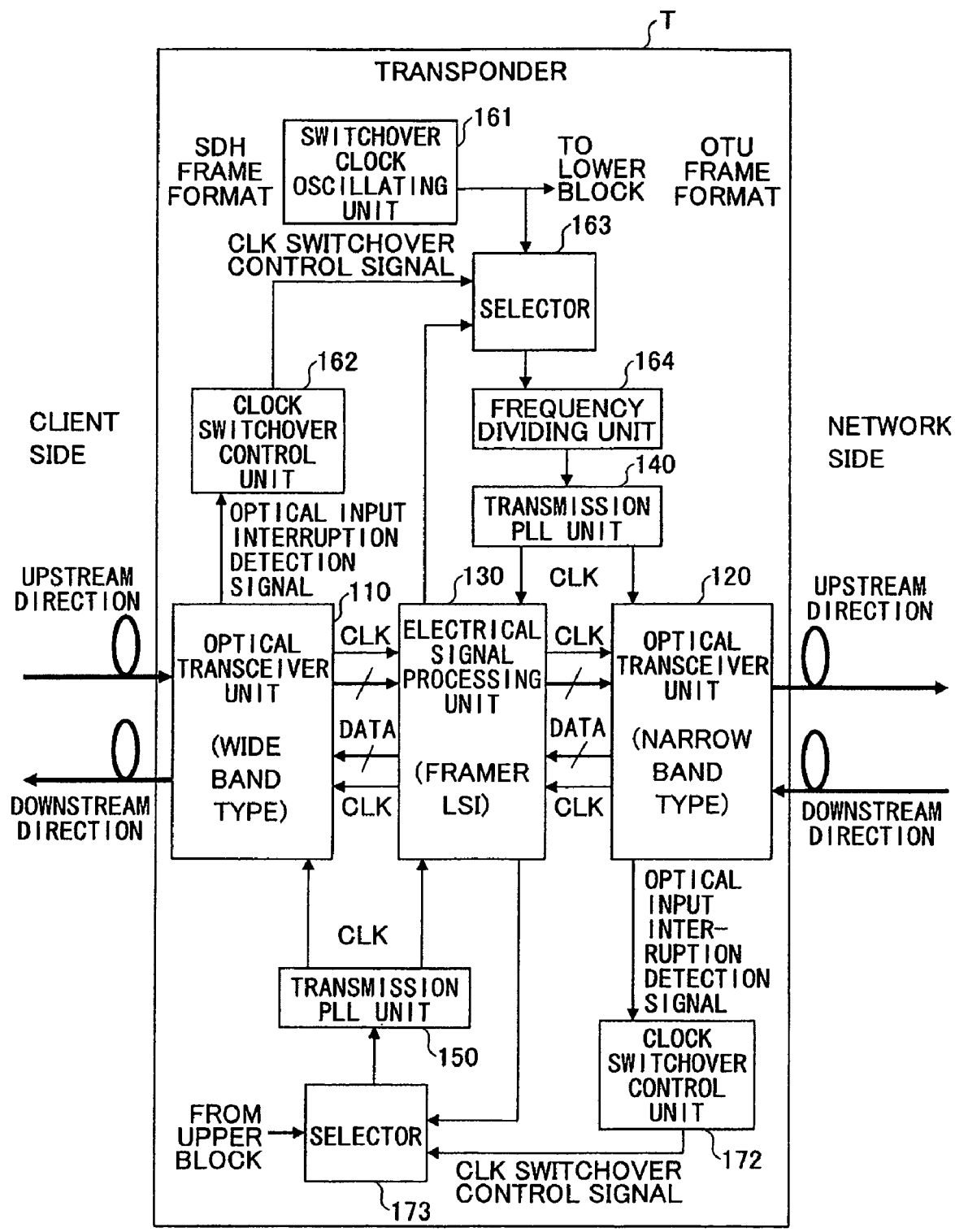
FIG. 3 is a drawing showing an internal configuration of a transponder provided with a clock switching function for use at the time of optical input interruption.
Figure 6:
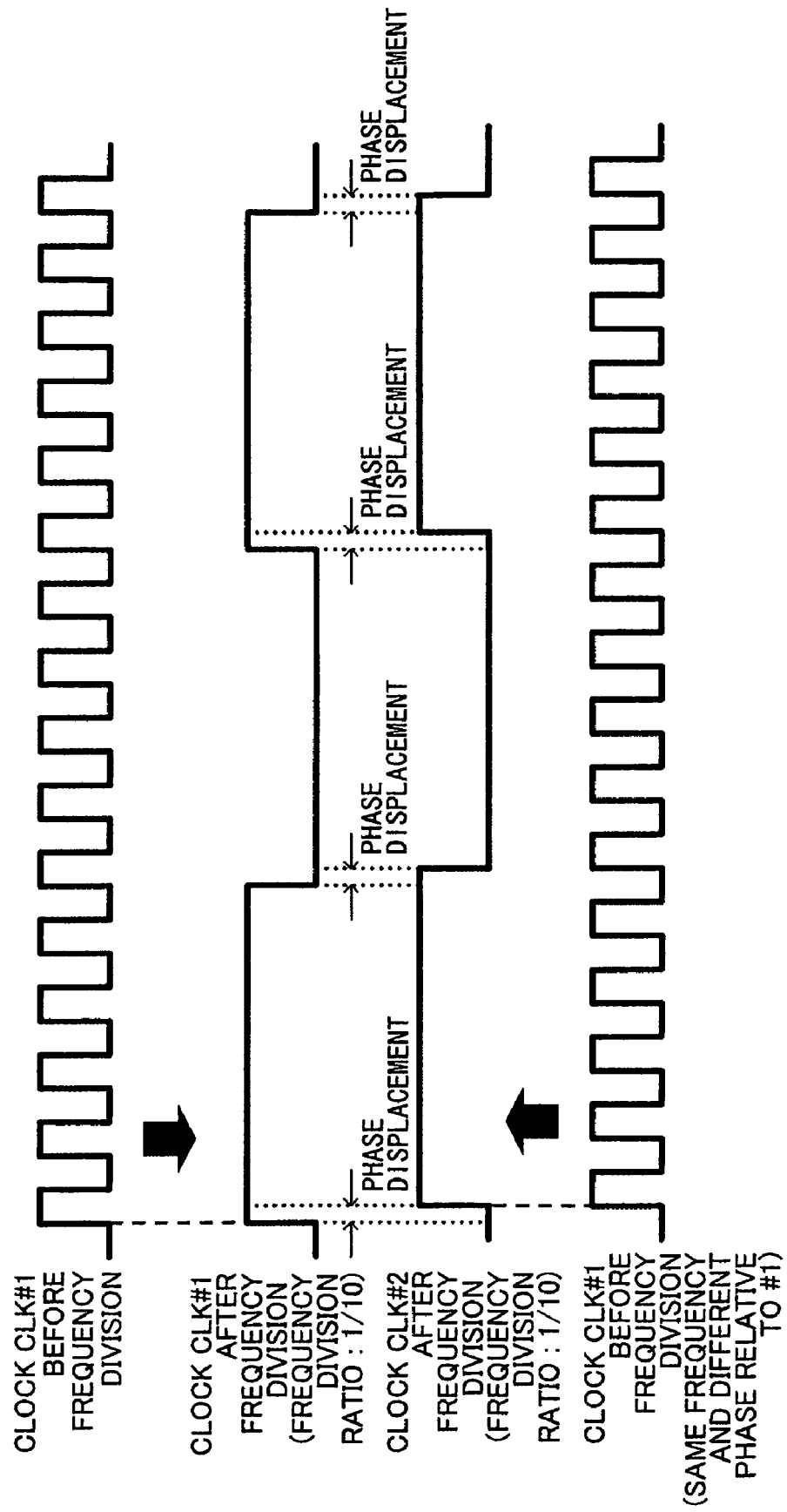
FIG. 6 is a drawing showing examples of operations of a transmission PLL unit observed at the time of clock switching with respect to the upstream direction.

In FIG. 11, the system portion extending from the client nodes N11, N12, and so on to the optical wavelength division multiplexing/demultiplexing unit MD1 on the left-hand side as well as the system portion extending from the client nodes N21, N22, and so on to the optical wavelength division multiplexing/demultiplexing unit MD2 on the right-hand side are the same as those shown in FIG. 1. Optical wavelength division multiplexing/demultiplexing units MD3 and MD4 are connected to the WDM transmission path between the optical wavelength division multiplexing/demultiplexing unit MD1 and the optical wavelength division multiplexing/demultiplexing unit MD2, with regenerators RG1, RG2, and so on connecting between MD3 and MD4.

FIG. 12 is a drawing showing the detail of an internal configuration of a clock system provided in a regenerator RG according to the third embodiment. Functional blocks corresponding to a more generic version of what is shown in FIG. 12 are the same as those of the first embodiment shown in FIG. 7.

The elements constituting the configuration shown in FIG. 12 are substantially the same as those shown in FIG. 8. Since the regenerator RG has a WDM-section network on either side thereof, the bit rates are the same between the two sides. In accordance with this, clock frequencies and frequency division ratios are slightly different from those shown in FIG. 8. Since the regenerator RG has a network on both sides, the concept of upstream and downstream does not exist in strict sense. However, the flow of signals toward the right-hand side is referred to as "upstream", and the flow of signals toward the left-hand side is referred to as "downstream" in order to make it easier to understand correspondence to the previously-described embodiments.

In the present embodiment, the clock of the upstream direction is used as a switchover-purpose reference clock for the downstream direction at the time of optical input interruption, thereby satisfying the requirement for frequency stability precision at the time of clock switchover.

Fourth Embodiment

FIG. 13 is a drawing showing the detail of an internal configuration of a clock system provided in a regenerator RG according to a fourth embodiment. This example is directed to a case in which the basic principle of using a clock for the opposite direction is applied to the upstream side. Functional blocks corresponding to a more generic version of what is shown in FIG. 13 are the same as those of the second embodiment shown in FIG. 9.

In the present embodiment, the clock of the downstream direction is used as a switchover-purpose reference clock for the upstream direction at the time of optical input interruption, thereby satisfying the requirement for frequency stability precision at the time of clock switchover.

According to at least one embodiment of the disclosed optical transmission apparatus, a clock for a predetermined direction is used as a switchover-purpose reference clock for the opposite direction at the time of optical input interruption, thereby making it possible to switch high-frequency clock signals first and then to perform frequency division. This arrangement can stabilize the clock.

Embodiments of the present invention have been described heretofore for the purpose of illustration. The present invention is not limited to these embodiments, but various variations and modifications may be made without departing from the scope of the present invention. The present invention should not be interpreted as being limited to the embodiments that are described in the specification and illustrated in the drawings.

What is claimed is:

1. An optical transmission apparatus, comprising:
   a first optical transceiver unit configured to exchange optical signals with an apparatus connected to a first input and output node and to perform signal conversion between optical signals and electrical signals;
   a second optical transceiver unit configured to exchange optical signals with an apparatus connected to a second input and output node and to perform signal conversion between optical signals and electrical signals;
   an electrical signal processing unit configured to connect between the first transceiver unit and the second transceiver unit and to perform electrical signal processing;
   a first transmission clock generating unit configured to generate, based on a first clock of a signal arriving through the first input and output node, a transmission-purpose clock used by the second transceiver unit that has frequency in a predetermined proportion to frequency of the first clock and is synchronized with the first clock;
   a second transmission clock generating unit configured to generate, based on a second clock of a signal arriving through the second input and output node, a transmission-purpose clock used by the first transceiver unit that has frequency in a predetermined proportion to frequency of the second clock and is synchronized with the second clock;
   a selector configured to select an output clock of the first transmission clock generating unit at a time of optical input interruption at the second input and output node; and
   a frequency dividing unit configured to produce a frequency-divided clock obtained by dividing frequency of the output clock selected by the selector and to supply the frequency-divided clock to the second transmission clock generating unit.

2. The optical transmission apparatus as claimed in claim 1, wherein the first input and output node is coupled to a client node, and the second input and output node is connected to a network, the optical transmission apparatus being a transponder that performs optical wavelength conversion between wideband optical signals of the client node and narrowband optical signals multiplexed for the network.

3. The optical transmission apparatus as claimed in claim 1, wherein the second input and output node is coupled to a client node, and the first input and output node is connected to a network, the optical transmission apparatus being a transponder that performs optical wavelength conversion between wideband optical signals of the client node and narrowband optical signals multiplexed for the network.

4. The optical transmission apparatus as claimed in claim 1, wherein the first input and output node is coupled to a first network, and the second input and output node is connected to a second network, the optical transmission apparatus being a regenerator that reconstructs transmission signals.

5. The optical transmission apparatus as claimed in claim 1, wherein the second input and output node is coupled to a first network, and the first input and output node is connected to a second network, the optical transmission apparatus being a regenerator that reconstructs transmission signals.

* * * * *